United States Patent
Takagi (12)

(10) Patent No.: US 6,355,767 B1
(45) Date of Patent: Mar. 12, 2002

(54) AROMATIC POLYCARBONATE RESIN COMPOSITION

(75) Inventor: Makoto Takagi, Tokyo (JP)

(73) Assignee: Teijin Chemicals, LTD, Tokyo (JP)

( * ) Notice: Subject to any disclaimer, the term of this patent is extended or adjusted under 35 U.S.C. 154(b) by 0 days.

(21) Appl. No.: 09/722,666

(22) Filed: Nov. 28, 2000

(51) Int. Cl.$^7$ .............................................. C08G 64/00
(52) U.S. Cl. ...................................... 528/196; 528/198
(58) Field of Search ................................. 528/196, 198

(56) References Cited

U.S. PATENT DOCUMENTS 5,055,523 A    10/1991   Inoue et al. ................. 525/148

FOREIGN PATENT DOCUMENTS

| EP | 1026205 | 8/2000 |
|---|---|---|
| EP | 1038920 | 9/2000 |
| JP | B2798892 | 10/1995 |
| JP | 09143356 | 6/1997 |
| JP | 143910 | 5/2000 |
| WO | 9911713 | 3/1999 |

*Primary Examiner*—Terressa M. Boykin

(57) ABSTRACT

An aromatic polycarbonate resin composition comprising:

(1) 10 to 90 wt % of an aromatic polycarbonate resin (component A) which is obtained from an ester exchange reaction between a diphenol and a dicarbonate ester and has a terminal hydroxyl group concentration of 10 to 70 mol % based on 100 molt of the total of all the terminal groups; and (2) 90 to 10 wt % of a thermoplastic graft copolymer resin (component B) which is obtained by grafting a vinyl cyanide monomer component and an aromatic vinyl monomer component to a diene-based rubber, the proportion of the vinyl cyanide monomer component to the copolymer resin being 10 to 27 wt % and the amount of a vinyl cyanide monomer contained in the copolymer resin being 200 ppm or less. According to the present invention, there is provided an aromatic polycarbonate resin composition which has excellent mechanical strength, particularly falling weight impact strength and improved hydrolysis resistance under a moist heat environment.

34 Claims, No Drawings

AROMATIC POLYCARBONATE RESIN COMPOSITION

FIELD OF THE INVENTION

The present invention relates to an aromatic polycarbonate resin composition having excellent mechanical strength and excellent resistance to moist heat. More specifically, it relates to an aromatic polycarbonate resin composition which has excellent mechanical strength, particularly falling weight impact strength, and improved hydrolysis resistance under a moist heat environment.

PRIOR ART

An aromatic polycarbonate resin is widely used thanks to its excellent mechanical properties such as impact resistance as well as excellent heat resistance and transparency. The methods of producing such an aromatic polycarbonate resin include one in which phosgene is directly reacted with a diphenol such as bisphenol A in a halogen compound solvent such as methylene chloride (interfacial polymerization), one in which an ester exchange reaction is carried out between a diphenol such as bisphenol and a carbonate ester such as diphenyl carbonate for polymerization (may be referred to as "melting method" hereinafter), and the like. Out of these production methods, one in which an ester exchange reaction is carried out between a diphenol and a carbonate ester is the most promising technology because it is free from problems caused by using phosgene and a halogen compound such as methylene chloride and has such an advantage that an aromatic polycarbonate resin can be produced at a low cost with a small load on environment.

Further, a resin composition comprising an aromatic polycarbonate resin and a thermoplastic graft copolymer resin (to be abbreviated as "ABS resin" hereinafter) obtained by grafting a vinyl cyanide monomer component and an aromatic vinyl monomer component to a diene-based rubber has excellent economical efficiency (a reduction in costs) and such an excellent feature that the moldability, platability and mechanical properties, particularly the dependence of impact resistance upon thickness in an Izod impact test, of an aromatic polycarbonate resin can be improved. Therefore, it is widely used in industrial fields such as housings for office equipment and portable electronic equipment, and car interior parts.

However, a resin composition obtained by mixing ABS resin with an aromatic polycarbonate resin has such a problem as deterioration in weld strength and falling weight impact strength compared with an aromatic polycarbonate resin alone. Particularly, office equipment and portable electronic equipment require high breaking strength at the time of falling and car interior parts require high breaking strength against impact at the time of a collision or the like. Further, a general Izod impact test is carried out as a standard test to obtain numerical values of impact strength of actual products of the above resin composition, but general Izod impact test values of the above resin composition are not so correlated to the impact strength values of the actual products. Therefore, actual products of a resin composition comprising an elastic material such as rubber are unsatisfactory in terms of impact strength in most cases even if the notched impact value of the resin composition is satisfactory. In this case, impact strength obtained by a falling weight impact test in which breaking strength is measured by colliding a ball or punch against one side of a test piece or the surface of a product at a high speed to give an impact is closely correlated to the strength of an actual product. Further, plastic moldings such as office equipment, portable electronic equipment and car interiors are strongly desired to be thin and lightweight because great importance is attached to the light weight, designability and portability of products. Sufficient impact resistance is required of even thin moldings. Particularly in these fields, impact strength obtained by a falling weight impact test has a great influence upon the characteristic properties of a product.

A resin composition comprising an aromatic polycarbonate resin and a thermoplastic graft copolymer obtained by grafting a vinyl cyanide monomer component and an aromatic vinyl monomer component to a diene-based rubber is disclosed by JP-B 7-98892 (the term "JP-B" as used herein means an "examined Japanese patent publication"). This aromatic polycarbonate resin is an aromatic polycarbonate resin substantially produced by the melting method. It is disclosed that this composition is superior in weld strength to a composition comprising an aromatic polycarbonate resin produced by the interfacial polymerization method. However, the impact resistance of the composition of this invention, particularly the falling weight impact resistance which is closely correlated to product strength is not improved and the falling weight impact strength of a thin molded product of the composition is still unsatisfactory.

JP-A 9-143356 (the term "JP-A" as used herein means an "unexamined published Japanese patent application") discloses a resin composition prepared by blending a metal salt compound with a mixed resin of an aromatic polycarbonate resin produced by the melting method and ABS resin. It is taught that this composition is excellent in weld strength, dry heat resistance at high temperatures and flame retardancy. However, when a metal salt compound is blended with an aromatic polycarbonate resin, there arise such problems as a deterioration in moist heat resistance such as the reduction in mechanical strength and the worsening of surface appearance because hydrolysis is promoted during long-time use or under a moist heat environment. This publication is utterly silent about a resin composition having excellent mechanical strength and moist heat resistance.

Meanwhile, great importance has been recently attached to the performance retention during long-time use from perspective which is safety and recyclability of a product, a reduction in environmental load by extending the service life of a product and the guarantee of a product by a manufacturer.

Under the situation, an aromatic polycarbonate resin composition which has excellent mechanical strength, particularly falling weight impact strength, and improved hydrolysis resistance under a moist heat environment has been desired.

SUMMARY OF THE INVENTION

It is an object of the present invention to provide an aromatic polycarbonate resin composition which has excellent mechanical strength, particularly falling weight impact strength, and improved hydrolysis resistance under a moist heat environment.

The inventor of the present invention have conducted intensive studies to achieve the above object of the present invention and have surprisingly found that a resin composition comprising an aromatic polycarbonate resin having a specific terminal hydroxyl group concentration produced by an ester exchange reaction and a thermoplastic graft copolymer resin produced by grafting a specific amount of a vinyl cyanide monomer component and containing a vinyl cyanide monomer in a specific amount or less has excellent falling weight impact strength particularly in a thin portion and improved hydrolysis resistance under a moist heat environment. The present invention has been accomplished based on this finding.

According to the present invention, there is provided an aromatic polycarbonate resin composition comprising: (1) 10 to 90 wt % of an aromatic polycarbonate resin (component A) which is obtained by an ester exchange reaction between a diphenol and a dicarbonate ester and has a terminal hydroxyl group concentration of amount of 10 to 70 mol % based on 100 mol % of the total of all the terminal groups, and (2) 90 to 10 wt % of a thermoplastic graft copolymer resin (component B) which is obtained by grafting a vinyl cyanide monomer component and an aromatic vinyl monomer component to a diene-based rubber, the proportion of the vinyl cyanide monomer component to the copolymer resin being 10 to 27 wt % and the amount of a vinyl cyanide monomer contained in the copolymer resin being 200 ppm or less.

Further, according to the present invention, there are provided aromatic polycarbonate resin compositions (I) to (IV):

(I) an aromatic polycarbonate resin composition comprising (1) 10 to 90 wt % of component A, (2) 90 to 10 wt % of component B, and (3) 1 to 100 parts by weight of a reinforcing filler (component C) based on 100 parts by weight of the total of components A and B;

(II) an aromatic polycarbonate resin composition comprising (1) 10 to 90 wt % of component A, 90 to 10 wt % of component B and (3) 1 to 50 parts by weight of a flame retardant (component D) based on 100 parts by weight of the total of components A and B;

(III) an aromatic polycarbonate resin composition comprising (1) 10 to 90 wt % of component A, (2) 90 to 10 wt % of component B and (3) 1 to 50 parts by weight of another thermoplastic resin (component E) based on 100 parts by weight of the total of components A and B; and (IV) an aromatic polycarbonate resin composition comprising (1) 10 to 90 wt % of component A, (2) 90 to 10 wt % of component B, (3) 1 to 100 parts by weight of a reinforcing filler (component C) based on 100 parts by weight of the total of components A and B, (4) 1 to 50 parts by weight of a flame retardant (component D) based on 100 parts by weight of the total of components A and B, and (5) 1 to 50 parts by weight of another thermoplastic resin (component E) based on 100 parts by weight of the total of components A and B.

The aromatic polycarbonate resin used as component A in the present invention is generally obtained by carrying out an ester exchange reaction between a diphenol and a dicarbonate ester (melting method). Typical examples of the diphenol used herein include hydroquinone, resorcinol, 1,6-dihydroxynaphthalene, 2,6-dihydroxynaphthalene, 4,4'-dihydroxydiphenyl, bis(4-hydroxyphenyl)methane, 1,1-bis(4-hydroxyphenyl)-1-phenylmethane, bis{(4-hydroxy-3,5-dimethyl)phenyl}methane, 1,1-bis(4-hydroxyphenyl)ethane, 1,2-bis(4-hydroxyphenyl)ethane, 1,1-bis(4-hydroxyphenyl)-1-phenylmethane, bis(4-hydroxyphenyl)-1-diphenylmethane, bis(4-hydroxyphenyl)-1-naphthylmethane, 2,2-bis(4-hydroxyphenyl)propane (so-called bisphenol A), 2-(4-hydroxyphenyl)-2-(3-hydroxyphenyl)propane, 2,2-bis{(4-hydroxy-3-methyl)phenyl}propane, 2,2-bis{(4-hydroxy-3,5-dimethyl)phenyl}propane, 2,2-bis{(3,5-dibromo-4-hydroxy)phenyl}propane, 2,2-bis{(3,5-dichloro-4-hydroxy)phenyl}propane, 2,2-bis{(3-bromo-4-hydroxy)phenyl}propane, 2,2-bis((3-chloro-4-hydroxy)phenyl)propane, 4-bromoresorcinol, 2,2-bis{(3-isopropyl-4-hydroxy)phenyl}propane, 2,2-bis{(3-phenyl-4-hydroxy)phenyl}propane, 2,2-bis{(3-ethyl-4-hydroxy)phenyl}propane, 2,2-bis{(3-n-propyl-4-hydroxy)phenyl}propane, 2,2-bis{(3-sec-butyl-4-hydroxy)phenyl}propane, 2,2-bis{(3-tert-butyl-4-hydroxy)phenyl}propane, 2,2-bis{(3-cyclohexyl-4-hydroxy)phenyl}propane, 2,2-bis{(3-methoxy-4-hydroxy)phenyl}propane, 2,2-bis(4-hydroxyphenyl)hexafluoropropane, 1,1-dibromo-2,2-bis(4-hydroxyphenyl)ethylene, 1,1-dichloro-2,2-bis{(3-phenoxy-4-hydroxy)phenyl}ethylene, ethylene glycol bis(4-hydroxyphenyl)ether, 2,2-bis(4-hydroxyphenyl)butane, 2,2-bis(4-hydroxyphenyl)-3-methylbutane, 2,2-bis(4-hydroxyphenyl)-3,3-dimethylbutane, 2,4-bis(4-hydroxyphenyl)-2-methylbutane, 1,1-bis(4-hydroxyphenyl)isobutane, 2,2-bis(4-hydroxyphenyl)pentane, 2,2-bis(4-hydroxyphenyl)-4-methylpentane, 3,3-bis(4-hydroxyphenyl)pentane, 1,1-bis(4-hydroxyphenyl)cyclohexane, 1,1-bis(4-hydroxyphenyl)-4-isopropylcyclohexane, 1,1-bis(4-hydroxyphenyl)-3,3,5-trimethylcyclohexane, 1,1-bis(4-hydroxyphenyl)cyclododecane, 9,9-bis(4-hydroxyphenyl)fluorene, 9,9-bis{(4-hydroxy-3-methyl)phenyl}fluorene, α,α'-bis(4-hydroxyphenyl)-o-diisopropylbenzene, α,α'-bis(4-hydroxyphenyl)-m-diisopropylbenzene, α,α'-bis(4-hydroxyphenyl)-p-diisopropylbenzene, 1,3-bis(4-hydroxyphenyl)-5,7-dimethyladamantane, 4,4'-dihydroxydiphenylsulfone, bis{(3,5-dimethyl-4-hydroxy)phenyl}sulfone, 4,4'-dihydrokydiphenyl sulfoxide, 4,4'-dihydroxydiphenyl sulfide, 4,4'-dihydroxydiphenyl ketone, 4,4'-dihydroxydiphenyl ether, 4,4'-dihydroxydiphenyl ester and the like. They may be used alone or in combination of two or more.

Out of these, a homopolymer or copolymer obtained from at least one bisphenol selected from the group consisting of bisphenol A, 2,2-bis{(4-hydroxy-3-methyl)phenyl}propane, 2,2-bis{(3,5-dibromo-4-hydroxy)phenyl}propane, ethylene glycol bis(4-hydroxyphenyl)ether, 2,2-bis(4-hydroxyphenyl)hexafluoropropane, 2,2-bis(4-hydroxyphenyl)butane, 1,1-bis(4-hydroxyphenyl)cyclohexane, 1,1-bis(4-hydroxyphenyl)-3,3,5-trimethylcyclohexane, 4,4'-dihydroxydiphenyl sulfone, bis{(3,5-dimethyl-4-hydroxy)phenyl}sulfone, 4,4'-dihydroxydiphenyl sulfoxide, 4,4'-dihydroxydiphenyl sulfide and 4,4'-dihydroxydiphenyl ketone is preferred, and a homopolymer of bisphenol A is particularly preferred.

Illustrative examples of the dicarbonate ester include diphenyl carbonate, ditolyl carbonate, bis(chlorophenyl) carbonate, m-cresyl carbonate, dinaphthyl carbonate, bis(diphenyl) carbonate, dimethyl carbonate, diethyl carbonate, dibutyl carbonate, dicyclohexyl carbonate and the like. The dicarbonate ester is not limited to these. Out of these, diphenyl carbonate is preferred. These dicarbonate esters may be used alone or in combination of two or more.

To produce a polycarbonate resin by reacting the above diphenol and dicarbonate ester by the melting method, a catalyst, terminal capping agent, antioxidant for diphenols and the like may be used as required. The polycarbonate resin may be a branched polycarbonate resin obtained by copolymerizing a polyfunctional aromatic compound having a functionality of 3 or more, polyester carbonate resin obtained by copolymerizing an aromatic or aliphatic difunctional carboxylic acid, or a mixture of two or more of the obtained polycarbonate resins.

Illustrative examples of the polyfunctional aromatic compound having a functionality of 3 or more include phloroglucin, phloroglucide, triphenols such as 4,6-dimethyl-2,4,6-tris(4-hydroxydiphenyl)heptene-2, 2,4,6-trimethyl-2,4,6-tris(4-hydroxyphenyl)heptane, 1,3,5-tri(4-hydroxyphenyl)benzene, 1,1,1-tris(4-hydroxyphenyl) ethane, 1,1,1-tris(3,5-dimethyl-4-hydroxyphenyl)ethane, 2,6-bis(2-hydroxy-5-methylbenzyl)-4-methylphenol and 4-{4-[1,1-bis(4-hydroxyphenyl)ethyl]benzene}-α, α-dimethylbenzylphenol, tetra(4-hydroxyphenyl)methane, bis(2,4-dihydroxyphenyl)ketone, 1,4-bis(4,4-dihydroxytriphenylmethyl)benzene, trimellitic acid, pyromellitic acid, benzophenonetetracarboxylic acid and acid chlorides thereof, 2-(4-hydroxyphenyl)-2-(3'-phenoxycarbonyl-4'-hydroxyphenyl)propane, 2-(4-hydroxyphenyl)-2-(3'-carboxy-4'-hydroxyphenyl)propane and the like. Out of these, 1,1,1-tris(4-hydroxyphenyl)ethane and 1,1,1-tris(3,5-dimethyl-4-hydroxyphenyl)ethane are preferred, and 1,1,1-tris(4-hydroxyphenyl)ethane is particularly preferred.

The reaction in the melting method is generally an ester exchange reaction between a diphenol and a dicarbonate ester which is carried out in the presence of an inert gas by mixing together the diphenol and the dicarbonate ester under heating and distilling off the formed alcohol or phenol. The reaction temperature, which changes according to the boiling point or the like of the formed alcohol or phenol, is generally 120 to 350° C. In the latter stage of the reaction, the pressure of the reaction system is reduced to 10 to 0.1 Torr to facilitate the distillation off of the formed alcohol or phenol. The reaction time is generally about 1 to 4 hours.

To accelerate the rate of polymerization in the melting method, a polymerization catalyst may be used. (i) An alkali metal compound or alkali earth metal compound and/or (ii) a nitrogen-containing basic compound are/is used as the polymerization catalyst for condensation.

The alkali metal compound or alkali earth metal compound used as a catalyst is, for example, a hydroxide, hydrogencarbonate, carbonate, acetate, nitrate, nitrite, sulfite, cyanate, thiocyanate, stearate, borohydride, benzoate, hydrogenphosphate, bisphenol salt or phenol salt of an alkali metal or alkali earth metal compound. Alkali metal compounds are particularly preferred.

Illustrative examples of the alkali metal compound include sodium hydroxide, potassium hydroxide, lithium hydroxide, sodium hydrogencarbonate, potassium hydrogencarbonate, lithium hydrogencarbonate, sodium carbonate, potassium carbonate, lithium carbonate, sodium acetate, potassium acetate, lithium acetate, sodium nitrate, potassium nitrate, lithium nitrate, sodium nitrite, potassium nitrite, lithium nitrite, sodium sulfite, potassium sulfite, lithium sulfite, sodium cyanate, potassium cyanate, lithium cyanate, sodium thiocyanate, potassium thiocyanate, lithium thiocyanate, sodium stearate, potassium stearate, lithium stearate, sodium borohydride, lithium borohydride, potassium borohydride, sodium phenylborate, sodium benzoate, potassium benzoate, lithium benzoate, disodium hydrogenphosphate, dipotassium hydrogenphosphate, dilithium hydrogenphosphate, disodium salts, dipotassium salts and dilithium salts of bisphenol A, and sodium salts, potassium salts and lithium salts of phenol. Sodium compounds are particularly preferred.

The amount of the alkali metal compound as a catalyst is preferably in the range of $10^{-8}$ to $10^{-5}$ mol. more preferably $10^{-8}$ to $10^{-6}$ mol, the most preferably $10^{-7}$ to $10^{-6}$ mol based on 1 mol of the diphenol. Outside the above range, such problems may arise that the alkali metal compound exerts a bad influence upon the physical properties of the obtained polycarbonate and that a high molecular weight polycarbonate cannot be obtained because an ester exchange reaction does not proceed fully.

Illustrative examples of the nitrogen-containing basic compound include ammonium hydroxides having an alkyl, aryl or alkylaryl group such as tetramethylammonium hydroxide ($Me_4NOH$), tetraethylammonium hydroxide ($Et_4NOH$), tetrabutylammonium hydroxide ($Bu_4NOH$), benzyltrimethylammonium hydroxide ($\phi$—$CH_2(Me)_3NOH$) and hexadecyltrimethylammonium hydroxide; tertiary amines such as triethylamine, tributylamine, dimethylbenzylamine and hexadecyldimethylamine; and basic salts such as tetramethylammonium borohydride ($Me_4NBH_4$), tetrabutylammonium borohydride ($BU_4NBH_4$), tetrabutylammonium tetraphenyl borate ($Bu_4NBPh_4$) and tetramethylammonium tetraphenyl borate ($Me_4NBPh_4$). Out of these, tetramethylammonium hydroxide ($Me_4NOH$), tetraethylammonium hydroxide ($Et_4NOH$) and tetrabutylammonium hydroxide ($BU_4NOH$) are preferred, and tetramethylammonium hydroxide ($Me_4NOH$) is particularly preferred.

The above nitrogen-containing basic compound is preferably used such that the amount of ammonium nitrogen atoms contained in the nitrogen-containing basic compound becomes $1\times10^{-5}$ to $1\times10^{-3}$ equivalent based on 1 mol of the diphenol. It is more preferably $2\times10^{-5}$ to $7\times10^{-4}$ equivalent, particularly preferably $5\times10^{-5}$ to $5\times10^{-4}$ equivalent based on the same standard.

In the present invention, catalysts generally used for an esterification reaction or ester exchange reaction, such as alkoxides of alkali metals and alkali earth metals, organic acid salts of alkali metals and alkali earth metals, zinc compounds, boron compounds, aluminum compounds, silicon compounds, germanium compounds, organic tin compounds, lead compounds, osmium compounds, antimony compounds, manganese compounds, titanium compounds and zirconium compounds may be used as desired. These catalysts may be used alone or in combination of two or more. The polymerization catalyst is used in an amount of preferably $1\times10^{-9}$ to $1\times10^{-5}$ equivalent, more preferably $1\times10^{-8}$ to $5\times10^{-6}$ equivalent based on 1 mol of the diphenol as a raw material.

It is recommended to control the amount of the terminal hydroxyl group of the aromatic polycarbonate resin of the present invention to 10 to 70 mol %, preferably 15 to 65 mol % more preferably 20 to 60 mol %, the most preferably 20 to 45 molt based on 100 mol % of the total of all the terminal groups of the aromatic polycarbonate resin. The mol % of the terminal hydroxyl group of the aromatic polycarbonate resin can be determined by $^1$H-NMR in accordance with a commonly used method.

The amount of the terminal hydroxyl group of the aromatic polycarbonate resin of the present invention can be controlled mainly by the charge ratio of the diphenol to the dicarbonate ester (typically diphenyl carbonate) as raw materials. Generally speaking, when the diphenyl carbonate/diphenol ratio is 1 or more, the total amount of non-hydroxyl group terminals is larger than the amount of the terminal hydroxyl group and when the ratio is smaller than 1, the amount of the terminal hydroxyl group is larger than the total amount of the non-hydroxyl group terminals, which changes according to polymerization conditions such as polymerization temperature and the degree of vacuum at the time of polymerization. To reduce the amount of the terminal hydroxyl group, a terminal capping agent is added to the aromatic polycarbonate resin in the latter stage or after the end of a polycondensation reaction to cap some of the terminal hydroxyl groups, thereby making it possible to control the amount of the terminal hydroxyl group.

Illustrative examples of the terminal capping agent include compounds such as phenol, p-t-butylphenol, p-t-butylphenylphenyl carbonate, p-t-butylphenyl carbonate, p-cumylphenol, p-cumylphenylphenyl carbonate, p-cumylphenyl carbonate, bis(chlorophenyl)carbonate, bis(bromophenyl)carbonate, bis(nitrophenyl)carbonate, bis(phenylphenyl)carbonate, bis(nitrophenyl)carbonate, bis(phenylphenyl)carbonate, chlorophenylphenyl carbonate, bromophenylphenyl carbonate, nitrophenylphenyl carbonate, diphenyl carbonate, methoxycarbonylphenylphenyl carbonate, 2,2,4-trimethyl-4-(4-hydroxyphenyl)chroman, 2,4,4-trimethyl-2-(4-hydroxyphenyl)chroman and ethoxycarbonylphenylphenyl carbonate. Out of these, 2-chlorophenylphenyl carbonate, 2-methoxycarbonylphenylphenyl carbonate and 2-ethoxycarbonylphenylphenyl carbonate are preferred, and 2-methoxycarbonylphenylphenyl carbonate is particularly preferred.

In the present invention, a deactivator for neutralizing the activity of a catalyst contained in the aromatic polycarbonate is preferably used. Illustrative examples of the deactivator include benzenesulfonic acid, p-toluenesulfonic acid, sulfonic acid esters such as methylbenzene sulfonate, ethylbenzene sulfonate, butylbenzene sulfonate, octylbenzene sulfonate, phenylbenzene sulfonate, methyl p-toluene sulfonate, ethyl p-toluene sulfonate, butyl p-toluene sulfonate, octyl p-toluene sulfonate and phenyl p-toluene sulfonate; and compounds such as trifluoromethanesulfonic acid, naphthalenesulfonic acid, sulfonated polystyrene, methyl acrylate-sulfonated styrene copolymer, dodecylbenzenesulfonic acid-2-phenyl-2-propyl, dodecylbenzenesulfonic acid-2-phenyl-2-butyl, tetrabutylphosphonium octylsulfonate, tetrabutylphosphonium decylsulfonate, tetrabutylphosphonium benzenesulfonate, tetraethylphoshonium dodecylbenzene sulfonate, tetrabutylphosphonium dodecylbenzene sulfonate, tetrahexylphosphonium dodecylbenzene sulfonate, tetraoctylphosphonium dodecylbenzene sulfonate, decylammonium butyl sulfate, decylammonium decyl sulfate, dodecylammonium methyl sulfate, dodecylammonium ethyl sulfate, dodecylmethylammonium methyl sulfate, dodecyldimethylammonium tetradecyl sulfate, tetradecyldimethylammonium methyl sulfate, tetramethylammonium hexyl sulfate, decyltrimethylammonium hexadecyl sulfate, tetrabutylammonium dodecylbenzyl sulfate, tetraethylammonium dodecylbenzyl sulfate and tetramethylammonium dodecylbenzyl sulfate. The deactivator is not limited to these. These compounds may be used in combination of two or more.

Out of the deactivators, phosphonium and ammonium salt deactivators are particularly stable at 200° C. or more. When any one of the deactivators is added to the aromatic polycarbonate resin, it neutralizes the catalyst quickly and an aromatic polycarbonate resin of interest can be obtained. That is, the deactivator is used in an amount of preferably 0.01 to 500 ppm, more preferably 0.01 to 300 ppm, particularly preferably 0.01 to 100 ppm based on the polycarbonate formed after a polymerization reaction.

The deactivator is preferably used in an amount of 0.5 to 50 mols based on 1 mol of the catalyst remaining after the reaction. The method of adding the deactivator to the aromatic polycarbonate resin is not particularly limited. For example, the deactivator may be added while the aromatic polycarbonate resin which is a reaction product is molten, or the deactivator may be added after the aromatic polycarbonate resin may be pelletized and remolten. In the former case, after the end of reaction the polycarbonate resin as a reaction product is in a molten state in a reactor or reacting extruder, so the deactivator may be added in the molten state and then the polycarbonate resin is formed and pelletized through a kneading extruder. The deactivator may be added and kneaded while the aromatic polycarbonate resin obtained by a polymerization reaction is from a reactor to a pelletizer through a kneading extruder to obtain an aromatic polycarbonate resin.

The viscosity average molecular weight ($\underline{M}$) of the aromatic polycarbonate resin is preferably 12,000 to 40,000, more preferably 14,000 to 30,000, particularly preferably 15,000 to 29,000. The aromatic polycarbonate resin having the above viscosity average molecular weight has sufficient strength as a composition and excellent melt flowability at the time of molding without molding distortion. The viscosity average molecular weight as used herein is obtained by inserting a specific viscosity (asp) obtained from a solution of 0.7 g of a polycarbonate resin dissolved in 100 ml of methylene chloride at 20° C. into the following expression.

$\eta sp/c = [\eta] + 0.45 \times [\eta]^2 c$ ([$\eta$] is an intrinsic viscosity)

$[\eta] = 1.23 \times 10^{-4} \ M^{0.83}$ $c = 0.7$

The amount of the aromatic polycarbonate resin in the present invention is 10 to 90 wt %, preferably 50 to 90 wt % based on 100 wt % of the total of the aromatic polycarbonate resin and the thermoplastic graft copolymer. When the amount of the aromatic polycarbonate resin is smaller than 10 wt %, a resin composition having sufficient heat resistance and impact strength cannot be obtained and when the amount is larger than 90 wt %, moldability and platability deteriorate.

The thermoplastic graft copolymer resin used as component B in the present invention is a graft copolymer resin obtained by grafting a vinyl cyanide monomer component and an aromatic vinyl monomer component to a diene-based rubber. The graft copolymer resin is generally a mixture of a graft copolymer having a graft chain for the diene-based rubber and a copolymer not grafted to the diene-based rubber. The copolymer comprising a non-grafted vinyl cyanide monomer component and an aromatic vinyl monomer component includes what is formed in a reaction and what comprises a separately polymerized copolymer.

The diene-based rubber component forming the graft copolymer resin is a rubber having a glass transition temperature of 10° C. or less, such as polybutadiene, polyisoprene or styrene-butadiene copolymer. The amount of a diene component is 3 to 60 wt %, preferably 10 to 40 wt % based on 100 wt % of the thermoplastic graft copolymer resin component. When the amount of the diene component is smaller than 3 wt %, impact resistance lowers and when the amount is larger than 60 wt %, the surface appearance of a molded product deteriorates. The vinyl cyanide monomer component to be grafted to the diene-based rubber is acrylonitrile, methacrylonitrile or the like. Out of these, acrylonitrile is preferred. The amount of the vinyl cyanide monomer component is 10 to 27 wt %, preferably 11 to 27 wt % based on 100 wt % of the thermoplastic graft copolymer resin obtained by grafting the vinyl cyanide monomer component and the aromatic vinyl monomer component to the diene-based rubber. When the amount of the vinyl cyanide monomer component is smaller than 10 wt %, impact resistance lowers and when the amount is larger than 27 wt %, impact resistance lowers as well.

The thermoplastic graft copolymer resin (component B) of the present invention contains a vinyl cyanide monomer in an amount of 200 ppm or less, preferably 100 ppm or less, more preferably 80 ppm or less, particularly preferably 50 ppm or less. When the proportion of the vinyl cyanide compound monomer component and the amount of the vinyl cyanide monomer are within the above ranges, more excellent mechanical properties such as falling weight impact strength and moist heat resistance can be obtained. When the amount of the vinyl cyanide monomer is smaller than 5 ppm, falling weight impact strength and moist heat resistance do not improve considerably and economic disadvantage caused by an increased number of steps for reducing the amount of the monomer becomes large. Therefore, it is appropriate to set the amount of the vinyl cyanide monomer to 5 ppm or more. The amount of the vinyl cyanide monomer contained can be measured by liquid chromatography.

The aromatic vinyl monomer component to be grafted to the diene-based rubber is styrene, a-methylstyrene or nucleus-substituted styrene. Styrene is preferred. The amount of the aromatic vinyl monomer component is 30 to 80 wt %, preferably 40 to 70 wt % based on 100 wt % of the thermoplastic graft copolymer resin. When the amount of the aromatic vinyl monomer component is smaller than 30 wt %, melt flowability lowers at the time of molding and when the amount is larger than 80 wt %, impact resistance deteriorates. Further, the aromatic vinyl monomer component may be combined with methyl acrylate, methyl methacrylate, ethyl acrylate, maleic anhydride or N-substituted maleimide. The amount of the component to be combined should be 15 wt % or less.

The weight average molecular weight of a non-grafted acrylonitrile-styrene polymer contained in the thermoplastic graft copolymer resin is preferably 70,000 to 200,000 (in terms of standard polystyrene measured by GPC), more preferably 80,000 to 180,000, much more preferably 85,000 to 160,000, the most preferably 125,000 to 160,000.

The graft ratio is 20 to 150%, preferably 30 to 130%, more preferably 40 to 70%, the most preferably 45 to 65%. The graft ratio G (%) is a value obtained from the following expression:

$$G=100 (P-B)/B$$

wherein P is the weight (g) of insoluble matter separated by centrifugation after a thermoplastic graft polymer resin obtained by grafting a vinyl cyanide monomer component and an aromatic vinyl monomer component to a diene-based rubber is dissolved in a 7:3 mixed solution of methyl ethyl ketone and methanol to dissolve its soluble matter, and B is the weight (g) of the diene-based rubber contained in the thermoplastic graft polymer resin.

Further, the average particle diameter of rubber obtained by electron microscopic observation is preferably 0.3 to 0.9 μm, more preferably 0.4 to 0.85 μm, much more preferably 0.45 to 0.8 μm, the most preferably 0.45 to 0.75 μm.

The thermoplastic graft copolymer resin of the present invention may be produced by any method such as bulk polymerization, suspension polymerization or emulsion polymerization but a thermoplastic graft copolymer resin produced by bulk polymerization is more preferred because it has more improved moist heat resistance. Although its mechanism has not been elucidated completely, it is conceivable that a metal component such as an emulsifier used for emulsion polymerization and suspension polymerization may act on the polycarbonate resin to affect its hydrolyzability.

The aromatic polycarbonate resin composition of the present invention may be blended with a heat stabilizer. The heat stabilizer is phosphorous acid, phosphoric acid, phosphonous acid, phosphonic acid or ester thereof, as exemplified by triphenyl phosphite, tris(nonylphenyl) phosphite, tris(2,4-di-tert-butylphenyl)phosphite, tridecyl phosphite, trioctyl phosphite, trioctadecyl phosphite, didecylmonophenyl phosphite, dioctylmonophenyl phosphite, diisopropylmonophenyl phosphite, monobutyldiphenyl phosphite, monodecyldiphenyl phosphite, monooctyldiphenyl phosphite, bis(2,6-di-tert-butyl-4-methylphenyl) pentaerythritol diphosphite, 2,2-methylenebis(4,6-di-tert-butylphenyl)octylphosphite, bis(nonylphenyl) pentaerythritol diphosphite, bis(2,4-di-tert-butylphenyl) pentaerythritol diphosphite, distearyl pentaerythritol diphosphite, tributyl phosphate, triethyl phosphate, trimethyl phosphate, triphenyl phosphate, diphenylmonoorthoxenyl phosphate, dibutyl phosphate, dioctyl phosphate, diusopropyl phosphate, tetrakis(2,4-di-tert-butylphenyl)-4,4'-biphenylene diphosphonite, dimethylbenzene phosphonate, diethylbenzene phosphonate, dipropylbenzene phosphonate and the like. Out of these, tetrakis(2,4-di-tert-butylphenyl)-4,4'-biphenylene diphosphonite trisnonylphenyl phosphate, tris(2,4, -di-tert-butylphenyl)phosphite, trimethyl phosphate, and dimethylbenzene phosphonate are preferred. These heat stabilizers may be used alone or in combination of two or more. The amount of the heat stabilizer is preferably 0.0001 to 1 part by weight, more preferably 0.0005 to 0.5 part by weight, much more preferably 0.001 to 0.1 part by weight based on 100 parts by weight of the total of components A and B of the present invention.

The aromatic polycarbonate resin composition of the present invention may also be blended with a generally known antioxidant to prevent oxidation. Illustrative examples of the antioxidant include pentaerythritol tetrakis (3-mercaptopropionate), pentaerythritol tetrakis(3-laurylthiopropionate), glycerol-3-stearyl thiopropionate, triethylene glycol-bis[3-(3-tert-butyl-5-methyl-4-hydroxyphenyl)propionate], 1,6-hexanediol-bis[3-(3,5-di-tert-butyl-4-hydroxyphenyl)propionate], pentaerythritol-tetrakis[3-(3,5-di-tert-butyl-4-hydroxyphenyl)propionate], octadecyl-3-(3,5-di-tert-butyl-4-hydroxyphenyl)propionate, 1,3,5-trimethyl-2,4,6-tris(3,5-di-tert-butyl-4-hydroxybenzyl)benzene, N,N-hexamethylenebis(3,5-di-tert-butyl-4-hydroxy-hydrocinnamide), 3,5-di-tert-butyl-4-hydroxy-benzyl phosphonate-diethyl ester, tris(3,5-di-tert-butyl-4-hydroxybenzyl)isocyanurate, 3,9-bis{1,1-dimethyl-2-[β-(3-tert-butyl-4-hydroxy- 5-methylphenyl) propionyloxy]ethyl}-2,4,8,10-tetraoxaspiro(5,5)undecane and the like. The amount of the antioxidant is 0 .0001 to 0.5 part by weight based on 100 parts by weight of the total of components A and B of the present invention.

To further improve releasability from a metal mold at the time of melt molding, the aromatic polycarbonate resin composition of the present invention may be blended with a release agent within limits not prejudicial to the object of the present invention. Examples of the release agent include olefin-based wax, olefin-based wax containing a carboxyl group and/or carboxylic anhydride group, silicone oil, organopolysiloxane, higher fatty acid ester of a monohydric or polyhydric alcohol, paraffin wax, beeswax and the like. The amount of the release agent is preferably 0.01 to 5 parts by weight based on 100 parts by weight of the total of components A and B of the present invention.

Polyethylene wax and/or a 1-alkene polymer are/is preferably used as the olefin-based wax to obtain an excellent releasing effect. Generally known polyethylene wax can be used, as exemplified by what is obtained by polymerizing ethylene at a high temperature and a high pressure, what is obtained by thermally decomposing polyethylene, what is obtained by separating a low molecular weight component from a polyethylene polymer and purifying it, and the like. The molecular weight and branching degree of the olefin-based wax are not limited but the number average molecular weight of the olefin-based wax is preferably 1,000 or more.

What is obtained by polymerizing a 1-alkene having 5 to 60 carbon atoms may be used as the 1-alkene polymer. The number average molecular weight of the 1-alkene polymer is preferably 1,000 or more.

The olefin-based wax containing a carboxyl group and/or carboxylic anhydride group is a compound containing a carboxyl group and/or carboxylic anhydride group by the post-treatment of olefin-based wax, preferably a compound modified by a post-treatment with maleic acid and/or maleic anhydride. Further, a compound containing a carboxyl group and/or carboxylic anhydride group copolymerized with a monomer when ethylene and/or 1-alkene are/is to be polymerized or copolymerized, preferably a compound containing maleic acid and/or maleic anhydride may also be used. The latter compound is preferred because it stably contains a carboxyl group and/or carboxylic anhydride group in a high concentration. The carboxyl group and carboxylic anhydride group may be bonded to any part of this olefin-based wax and their concentrations are not particularly limited but preferably 0.1 to 6 meq/g based on 1 g of the olefin-based wax. Commercially available products of the olefin-based wax containing a carboxyl group and/or carboxylic anhydride group include Diacarna-PA30 [trade name of Mitsubishi Chemical Co., Ltd.], Hiwax acid treated 2203A and 1105A [Mitsui Petrochemical Industries, Ltd.] and the like. They may be used alone or in combination of two or more.

When a reinforcing filler (component C) is used in the present invention, the addition of olefin-based wax containing a carboxyl group and/or carboxylic anhydride group has not only the effect of further improving releasability from a metal mold at the time of melt molding but also the effect of suppressing a reduction in impact strength caused by blending a reinforcing filler advantageously.

The higher fatty acid ester is preferably a partial ester or whole ester of a monohydric or polyhydric alcohol having 1 to 20 carbon atoms and a saturated fatty acid having 10 to 30 carbon atoms. Illustrative examples of the partial ester or whole ester of a monohydric or polyhydric alcohol and a saturated fatty acid include glycerin monostearate, glycerin distearate, glycerin tristearate, sorbitol monostearate, glycerin monobehenate, pentaerythritol monostearate, pentaerythritol tetrastearate, pentaerythritol tetrapelargonate, propylene glycol monostearate, stearyl stearate, palmityl palmitate, butyl stearate, methyl laurate, isopropyl palmitate, biphenyl biphenate, sorbitan monostearate, 2-ethylhexyl stearate and the like. Out of these, monoglyceride stearate, triglyceride stearate and pentaerythritol tetrastearate are preferred.

The aromatic polycarbonate resin composition of the present invention may be blended with an optical stabilizer within limits not prejudicial to the object of the present invention. Illustrative examples of the optical stabilizer include 2-(2'-hydroxy-5'-tert-octylphenyl)benzotriazole, 2-(3-tert-butyl-5-methyl-2-hydroxyphenyl)-5-chlorobenzotriazole, 2-(5-methyl-2-hydroxyphenyl) benzotriazole, 2-[2-hydroxy-3,5-bis(α, α-dimethylbenzyl) phenyl]-2H-benzotriazole, 2,2'-methylenebis(4-cumyl-6-benzotriazolephenyl), 2,2'-p-phenylenebis(1,3-benzooxazin-4-one), 2-(4,6-diphenyl-1,3,5-triazine-2-yl)-5-hexyloxyphenol, 2-(4,6-bis(2,4-dimethylphenyl)-1,3,5-triazin-2-yl)-5-hexyloxyphenol and the like. The amount of the optical stabilizer is preferably 0.01 to 2 parts by weight based on 100 parts by weight of the total of components A and B of the present invention.

The aromatic polycarbonate resin composition of the present invention may be blended with an antistatic agent within limits not prejudicial to the object of the present invention. Illustrative examples of the antistatic agent include polyether ester amide, glycerin monostearate, dodecylbenzenesulfonic acid ammonium salts, dodecylbenzenesulfonic acid phosphonium salts, alkylsulfonic acid sodium salts, monoglyceride maleic anhydride, diglyceride maleic anhydride and the like.

The aromatic polycarbonate resin composition of the present invention may be blended with a reinforcing filler (component C). Illustrative examples of the reinforcing filler include glass-based fillers such as glass chopped fiber, glass milled fiber, glass robing strand, glass flake, glass bead and glass powder; carbon-based fillers such as carbon fiber, carbon milled fiber, carbon robing strand and carbon flake; inorganic fillers such as talc, mica, wollastonite, kaolin, montmorillonite, bentonite, sepiolite, xonotlite, clay and silica; organic fillers such as aramide fiber; inorganic pigments such as titanium oxide; carbon black and the like. They may be used alone or in combination. Out of these, inorganic fillers such as talc, wollastonite and mica are preferred because they have a high reinforcing effect and the great effect of improving hydrolysis resistance. Talc and wollastonite are the most preferred.

The amount of the reinforcing filler (component C) is preferably 1 to 100 parts by weight, more preferably 1 to 50 parts by weight, much more preferably 1 to 30 parts by weight based on 100 parts by weight of the total of components A and B of the present invention.

The aromatic polycarbonate resin composition of the present invention may further be blended with a flame retardant (component D). The flame retardant is selected from the group consisting of a halogenated bisphenol A polycarbonate flame retardant, organic salt flame retardant, aromatic phosphoric ester flame retardant, halogenated aromatic phosphoric ester flame retardant, aromatic phosphagene polymer flame retardant, red phosphorus flame retardant and silicone flame retardant. They may be used alone or in combination. Examples of the halogenated bisphenol A polycarbonate flame retardant include tetrachlorobisphenol A polycarbonate flame retardant, tetrachlorobisphenol A-bisphenol A copolycarbonate flame retardant, tetrabromobisphenol A polycarbonate flame retardant, tetrabromobisphenol A-bisphenol A copolycarbonate flame retardant and the like. Examples of the organic salt flame retardant include dipotassium diphenylsulfone-3,3'-disulfonate, potassium diphenylsulfone-3-sulfonate, sodium 2,4,5-trichlorobenzene sulfonate, potassium 2,4,5-trichlorobenzene sulfonate, potassium bis(2,6-dibromo-4-cumylphenyl)phosphate, sodium bis(4-cumylphenyl) phosphate, imide potassium bis(p-toluenesulfone), imide potassium bis(diphenylphosphate), potassium bis(2,4,6-tribromophenyl)phosphate, potassium bis(2,4-dibromophenyl)phosphate, potassium bis(4-bromophenyl) phosphate, potassium diphenylphosphate, sodium diphenyl phosphate, potassium perfluorobutane sulfonate, sodium or potassium lauryl sulfate, sodium or potassium hexadecyl sulfate and the like. Examples of halogenated aromatic phosphoric ester flame retardant include tris(2,4,6-tribromophenyl)phosphate, tris(2,4-dibromophenyl) phosphate, tris(4-bromophenyl)phosphate and the like. Examples of the aromatic phosphoric ester flame retardant include triphenyl phosphate, tris(2,6-xylyl)phosphate, resorcinol bis(dixylenylphosphate), hydroquinone bis (dixylenylphosphate), 4,4'-biphenol bis (dixylenylphosphate), bisphenol A bis(dixylenylphosphate), resorcinol bis (diphenylphosphate), hydroquinone bis (diphenylphosphate), 4,4'-biphenol bis (diphenylphosphate), bisphenol A bis (diphenylphosphate), aromatic polyphosphate obtained from resorcin and phenol as aromatic ring sources and containing no phenolic OH group, aromatic polyphosphate obtained from resorcin and phenol as aromatic ring sources and containing a phenolic OH group, aromatic polyphosphate obtained from hydroquinone and phenol as aromatic ring sources and containing no phenolic OH group, aromatic polyphosphate containing a similar phenolic OH group (aromatic polyphosphates given below mean both aromatic polyphosphates containing a phenolic OH group and aromatic polyphosphates containing no phenolic OH group) aromatic polyphosphates obtained from bisphenol A and phenol as aromatic ring sources, aromatic polyphosphates obtained from tetrabromobisphenol A and phenol as aromatic ring sources, aromatic polyphosphates obtained from resorcin and 2,6-xylenol as aromatic ring sources, aromatic polyphosphates obtained from hydroquinone and 2,6-xylenol as aromatic ring sources, aromatic polyphosphates obtained from tetrabromobisphenol A and 2,6-xylenol as aromatic ring sources, and the like.

Examples of the aromatic phosphagene polymer flame retardant include phenoxyphosphagen oligomer, cyclic phenoxyphosphagen oligomer and the like.

Out of these flame retardants, tetrabromobisphenol A polycarbonate flame retardant and tetrabromobisphenol A-bisphenol A copolycarbonate flame retardant are preferred and tetrabromobisphenol A polycarbonate flame retardant is more preferred as the halogenated bisphenol A polycarbonate flame retardant. Potassium perfluorobutane sulfonate, dipotassium diphenylsulfone-3,3'-disulfonate, potassium diphenylsulfone-3-sulfonate and sodium 2,4,5-trichlorobenzene sulfonate are preferred as the organic salt flame retardant. Triphenyl phosphate, tricresyl phosphate, cresyldiphenyl phosphate and resorcinol bis (dixylenylphosphate), bisphenol A bis (diphenylphosphate), phenoxyphosphagen oligomer, cyclic phenoxyphosphagen oligomer, bis(2,3-dibromopropyl)phosphate and tris(2,3-dibromopropyl)phosphate are preferred as the aromatic phosphoric ester flame retardant. Out of these, triphenyl phosphate, bisphenol A bis(diphenylphosphate) and resorcinol bis(dixylenylphosphate) which are aromatic phosphoric ester flame retardants having the greater effect of improving hydrolysis resistance of the present invention are the most preferred.

The amount of the flame retardant (component D) is 1 to 50 parts by weight, preferably 1 to 30 parts by weight, more preferably 1 to 20 parts by weight based on 100 parts by weight of the total of components A and B of the present invention.

The aromatic polycarbonate resin composition of the present invention may further contain another thermoplastic resin (component E) in addition to the above components A and B. The aromatic polycarbonate resin composition preferably contains an impact strength modifier. Examples of the impact strength modifier include acrylic ester-based core-shell graft copolymers, polyurethane-based elastomers, polyester-based elastomers and the like.

The acrylic ester-based core-shell graft copolymers include core-shell polymers prepared by forming a shell obtained by polymerizing an alkyl (meth)acrylate and optionally a copolymerizable vinyl monomer around a core made from a copolymer of a rubber-like alkyl (meth)acrylate polymer having an alkyl group having 2 to 8 carbon atoms and a diene-based rubber-like polymer or a mixture thereof, and multi-layer core-shell polymers obtained in the same manner as described above. What comprises a core made from a diene-based rubber-like polymer alone may be used. Examples of the acrylic ester core-shell graft polymer include resins marketed by Kureha Chemical Industry, Co., Ltd. under the trade names of HIA-15 and HIA-28. Examples of what comprises a core made from a diene-based rubber-like polymer alone include a resin marketed by Kureha Chemical Industry, Co., Ltd. under the trade name of Paraloid EXL-2602.

Further, a polymer obtained by graft polymerizing an alkyl (meth)acrylate and optionally a copolymerizable vinyl monomer with composite rubber having such a structure that a polyorganosiloxane component and a poly(meth)alkyl acrylate component are interpenetrated such that they cannot be separated from each other (to be referred to as "IPN type polymer" hereinafter) may be used. The IPN type polymer is commercially available under the trade names of Metablen S-2001 and Metablen SRK-200 from Mitsubishi Rayon Co., Ltd. and easily acquired.

The thermoplastic polyurethane elastomers usable in the present invention are obtained from the reaction of an organic polyisocyanate, polyol and a chain extender having 2 or 3 functional groups and a molecular weight of 50 to 400. Currently known thermoplastic polyurethane elastomers may be used. The thermoplastic polyurethane elastomers include Kuramiron U (trade name) of Kuraray Co., Ltd. and the like which can be easily acquired.

The thermoplastic polyester elastomers usable in the present invention are obtained by polycondensing a bifunctional carboxylic acid component, alkylene glycol component and polyalkylene glycol component. Currently known thermoplastic polyester elastomers may be used. The thermoplastic polyester elastomers include Pelprene (trade name) of Toyobo Co., Ltd., Nouvelan (trade name) of Teijin Limited and the like which are easily acquired.

The aromatic polycarbonate resin composition of the present invention may contain another thermoplastic resin than the above impact strength modifier.

Illustrative examples of the another thermoplastic resin (component E) include aromatic polyester resins such as polyethylene terephthalate and polybutylene terephthalate, polyamide resin, polyimide resin, polyether imide resin, polyurethane resin, polyphenylene ether resin, polyphenylene sulfide resin, polysulfone resin, polyolefin resins such as polyethylene and polypropylene, polystyrene resin, polymethacrylate resin, phenol resin, epoxy resin and the like.

The amount of the component E is preferably 1 to 30 parts by weight based on 100 parts by weight of the total of components A and B of the present invention. The amount of the impact strength modifier is particularly preferably 1 to 10 parts by weight based on the same standard.

The aromatic polycarbonate resin composition of the present invention may contain polytetrafluoroethylene (may be abbreviated as PTFE) having fibril forming ability as component F so as to further improve mainly flame retardancy.

PTFE having fibril forming ability has an extremely high molecular weight and shows such a tendency that PTFE's are bonded together into a fibrous form by external action such as shearing force. The number average molecular weight obtained from standard specific gravity of PTFE is preferably 1,000,000 to 10,000,000, more preferably 2,000,000 to 9,000,000. PTFE may be used in a solid form or aqueous dispersion. PTFE having fibril forming ability may be mixed with another resin to improve dispersibility in the resin and obtain excellent flame retardancy and mechanical properties.

Commercially available products of PTFE having fibril forming ability include Teflon 6J of Dupont-Mitsui Fluorochemicals Co., Ltd., Polyfuron MPA FA500 and F-201L of Daikin Industries, Ltd., and the like. Typical commercially available products of aqueous dispersion PTFE include Fluon AD-1 and AD-936 of Asahi-ICI Fluoropolymers Co., Ltd., Fluon D-1 and D-2 of Daikin Industries, Ltd., Teflon 30J of Dupont-Mitsui Fluorochemical Co., Ltd. and the like. Commercially available products of PTFE mixture include Metablen A3000 of Mitsubishi Rayon Co., Ltd., BLENDEX449 of GE Specialty Chemical Co., Ltd. and the like.

The amount of the component F is preferably 0.05 to 3 parts by weight, more preferably 0.08 to 1.5 parts by weight, much more preferably 0.1 to 1.0 part by weight in terms of PTFE based on 100 parts by weight of the total of components A and B of the present invention.

Any method is employed to produce the aromatic polycarbonate resin composition of the present invention. For example, a method in which raw materials are mixed by a tumbler, V-type mixer, super mixer, Nauta mixer, Banbury mixer, kneading roll or extruder is advantageously employed. The thus obtained aromatic polycarbonate resin composition can be formed into a molded product by a generally known method such as injection molding, extrusion molding, blow molding, rotational molding or compression molding directly or after it is pelletized by a melt extruder. To obtain stable physical properties by improving the miscibility of the aromatic polycarbonate resin composition of the present invention, a twin-screw extruder is preferably used for melt extrusion. Further, when a reinforcing filler is to be blended, various methods may be employed. For example, the reinforcing filler is supplied directly from the hopper of an extruder or an intermediate portion of an extruder, it is mixed with an aromatic polycarbonate resin and ABS resin (component B) in advance, a master is formed by mixing it with part of an aromatic polycarbonate resin and ABS resin and supplied, or the master is supplied from an intermediate portion of an extruder.

The thus obtained aromatic polycarbonate resin composition of the present invention is useful for housings and chassis for OA equipment such as personal computers, wordprocessors, facsimiles, copiers and printers, OA interior parts such as CD-ROM trays, chassis, turn tables, pick-up chassis and gears, housings and parts for home electric appliances such as TV sets, videos, electric washing machines, electric dryers and electric cleaners, power tools such as power saws and power drills, optical equipment parts such as telescope lens barrels, microscope lens barrels, camera bodies, camera housings and camera lens barrels, and car parts such as meter panels. It is extremely useful for housings (office equipment housings and portable personal computers) and car interior parts (such as center clusterpanels and the like) all of which require especially falling weight impact strength and moist heat resistance. Since the aromatic polycarbonate resin composition of the present invention rarely deteriorates due to its excellent heat moist resistance even when it is used for a long time or under a moist heat environment, it is extremely useful in the recycling of products.

EXAMPLES

The following examples are given to further illustrate the present invention. "Parts" or "%" in the examples mean "parts by weight" and "wt %", respectively. The proportions of the aromatic polycarbonate resin (component A) and ABS resin (component B) are based on 100 wt % of the total of the aromatic polycarbonate resin and ABS resin. The amounts of the filler (component C), flame retardant (component D), rubber elastic material (component E) and dripping preventing agent (component F) are based on 100 parts by weight of the total of the aromatic polycarbonate resin and ABS resin. Evaluation items and symbols for components contained in the composition mean the following.

(1) concentration of terminal hydroxyl group 0.02 g of a sample is dissolved in 0.4 ml of chloroform, the amounts of a terminal hydroxyl group and terminal phenyl group are measured by $^1$H-NMR (EX-270 of JEOL Ltd.) at 20° C., and the concentration of the terminal hydroxyl group is calculated from the following expression (I).

$$\text{concentration of terminal hydroxyl group (mol \%)}=(\text{number of terminal hydroxyl groups/total number of terminals})\times 100 \quad \text{(I)}$$

(2) falling weight impact strength

An aluminum punch having an end radius (R) of 6.4 mm is collided with center portions of plate-like molded products measuring 100 mm×100 mm×1 mmt and 100 mm×100 mm×2 mmt by the Hydroshot MTH-1 of Shimadzu Corporation at an impact speed of 7 m/s to punch the molded products so as to measure breaking energy (J: joule).

(3) hydrolysis resistance (moist heat resistance retention)

After about 50 g pellets of each of aromatic polycarbonate resin compositions obtained in Examples and Comparative Examples are subjected to a moist heat treatment at 65° C. and 85% RH for 1,500 hours in an environmental tester (Plastinus Sub-Zero Lucifer of Tabai Espec Corp., Ltd.), the molecular weight of the aromatic polycarbonate resin composition is measured in the same manner as an aromatic polycarbonate resin. That is, pellets of the aromatic polycarbonate resin composition before and after the moist heat treatment are dissolved in methylene chloride, insoluble matter is removed by filtration, the specific viscosity of the resulting solutions is measured in the same manner as in the measurement of the viscosity average molecular weight of a polycarbonate resin described in this text, and further the viscosity average molecular weight of the aromatic polycarbonate resin composition is calculated using the same expression. When the viscosity average molecular weight of the aromatic polycarbonate resin composition before the moist heat treatment is represented by Mv1 and the viscosity average molecular weight of the aromatic polycarbonate resin composition after the moist heat treatment is represented by Mv2, the moist heat resistance retention is calculated from the following expression (II).

$$\text{moist heat resistance retention (\%)}=100\times Mv2/Mv1 \quad \text{(II)}$$

(4) flame retardancy

A vertical flame test is carried out on a 1.6 mm thick sample in accordance with UL-94.

(a) aromatic polycarbonate resin (1) EX-PC

Reference Example 1 (production of aromatic polycarbonate resin of the present invention)

228 parts of 2,2-bis(4-hydroxyphenyl)propane, 223 parts (about 1.06 mol/1 mol of bisphenol A) of diphenyl carbonate (of Bayer Corp.) and 0.000024 part (about 6×10$^{-7}$ mol/1 mol of bisphenol A) of sodium hydroxide and 0.0073 part (about 8×10$^{-5}$ mol/1 mol of bisphenol A) of tetramethylammonium hydroxide as catalysts were charged into a reactor equipped with a stirrer and fractionating column and the inside of the reactor was substituted by nitrogen. The resulting mixture was heated at 200° C. and dissolved under agitation. Most of phenol was distilled off at a reduced pressure of 30 Torr in one hour while the reactor was heated, and then a polymerization reaction was carried out at a reduced pressure of 1 Torr by increasing the temperature to 270° C. for 2 hours. 0.0035 part (about $6 \times 10^{-6}$ mol/l mol of bisphenol A) of tetrabutylphosphonium dodecylbenzene sulfonate was added as a catalyst neutralizer while it was molten to continue the reaction at 270° C. and 10 Torr or less so as to obtain an aromatic polycarbonate resin having a viscosity average molecular weight of 23,300 and a terminal hydroxyl group concentration of 34 mol %. This aromatic polycarbonate resin was supplied into an extruder by a gear pump. 0.003 wt % of trisnonylphenyl phosphate and 0.05 wt % of trimethyl phosphate were added from an intermediate portion of the extruder to obtain aromatic polycarbonate resin pellets. The obtained aromatic polycarbonate resin is designated as EX-PC.

(2) CEX-PC

Reference Example 2 (production of aromatic polycarbonate resin as control)

An aromatic polycarbonate resin was produced in the same manner as in Reference Example 1 except that the amount of diphenyl carbonate (of Bayer Corp.) was changed to 209 parts (about 0.95 mol/l mol of bisphenol A). This aromatic polycarbonate resin had a viscosity average molecular weight of 23,100 and a terminal hydroxyl group concentration of 78 mol %. The obtained aromatic polycarbonate resin is designated as CEX-PC.

Examples 1 to 6 and Comparative Examples 1 to 4

Components shown in Table 1 were mixed together by a V-type mixer and the resulting mixture was melt extruded by a 30 mm-diameter vented twin-screw extruder [TEX-30XSST of the Japan Steel Works, Ltd.] using a vacuum pump under a vacuum of 40 Torr at a cylinder temperature of 250° C. to be pelletized. Thereafter, the pellets were dried at 100° C. for 5 hours and test pieces were formed from the pellets by an injection molding machine [T-150T of FANUC Ltd.] at a cylinder temperature of 250° C. and a metal mold temperature of 60° C. and evaluated. The evaluation results are shown in Table 1. Symbols indicating components shown in Table 1 are as follows.

(A) aromatic polycarbonate resins

EX-PC: aromatic polycarbonate resin produced in the above Reference Example 1

CEX-PC: aromatic polycarbonate resin produced in the above Reference Example 2

(B) ABS resins

ABS-1: ABS resin prepared by pelletizing from a multistage vented twin-screw extruder a polymer produced by bulk polymerization and obtained from a separation/recovery apparatus comprising a multi-tubular heat exchanger and a decompression chamber. As for the composition of ABS resin, it comprised 25 wt % of acrylonitrile, 15 wt % of butadiene and 60 wt % of styrene. The weight average molecular weight of an acrylonitrile-styrene polymer which was not grafted was 150,000 (in terms of standard polystyrene measured by GPC), the graft ratio was 55%, the average rubber particle diameter obtained by electron microscopic observation was 0.60 μm, and the amount of an acrylonitrile monomer measured by liquid chromatography by dissolving ABS resin in chloroform was 250 ppm.

ABS-2: ABS resin prepared by charging ABS-1 obtained above into a stainless steel vessel equipped with an agitating element, adding methanol 7 times as much as ABS-1 by weight to wash ABS-1 under agitation for 1 hour, and then vacuum drying ABS-1 at 60° C. for 12 hours. The amount of an acrylonitrile monomer contained In the ABS resin was 50 ppm.

ABS-3: ABS resin prepared by repeating 2 hours of washing ABS-1 obtained above with methanol in the same manner as ABS-2 three times and vacuum drying it at 60° C. for 12 hours. The amount of an acrylonitrile monomer contained in the ABS resin was 20 ppm.

ABS-4: ABS resin prepared by pelletizing from a multistage vented twin-screw extruder a polymer produced by bulk polymerization and obtained from a separation/recovery apparatus comprising a multi-tubular heat exchanger and a decompression chamber. As for the composition of the ABS resin, it comprised 8 wt % of acrylonitrile, 30 wt % of butadiene and 62 wt % of styrene. The weight average molecular weight of an acrylonitrile-styrene polymer which was not grafted was 150,000 (in terms of standard polystyrene measured by GPC), the graft ratio was 55%, and the average rubber particle diameter obtained by electron microscopic observation was 0.80 μm. This ABS resin was subjected to 2 hours of washing with methanol in the same manner as ABS-2 three times and then vacuum dried at 60° C. for 12 hours. The amount of an acrylonitrile monomer contained in the ABS resin was 20 ppm.

ABS-5: ABS resin prepared by pelletizing from a multistage vented twin-screw extruder a polymer produced by bulk polymerization and obtained from a separation/recovery apparatus comprising a multi-tubular heat exchanger and a decompression chamber into a granular form. As for the composition of the ABS resin, it comprised 15 wt % of acrylonitrile, 25 wt % of butadiene and 60 wt % of styrene. The weight average molecular weight of an acrylonitrile-styrene polymer which was not grafted was 90,000 (in terms of standard polystyrene measured by GPC), the graft ratio was 55%, and the average rubber particle diameter obtained by electron microscopic observation was 0.80 μm. This ABS resin was subjected to 2 hours of washing with methanol in the same manner as ABS-2 three times and then vacuum dried at 60° C. for 12 hours. The amount of an acrylonitrile monomer contained in the ABS resin was 20 ppm.

ABS-6: ABS resin prepared by solidifying a graft copolymer resin obtained by emulsion graft polymerization with dilute sulfuric acid, washing, filtering and vacuum drying the resin at 60° C. for 12 hours. As for the composition of the ABS resin, it comprised 33 wt % of acrylonitrile, 35 wt % of butadiene and 32 wt % of styrene. The weight average molecular weight of an acrylonitrile-styrene polymer which was not grafted was 120,000 (in terms of standard polystyrene measured by GPC), the graft ratio was 50%, the average rubber particle diameter obtained by electron microscopic observation was 0.40 μm, and the amount of an acrylonitrile monomer measured by liquid chromatography was 50 ppm.

<other components>

(C) reinforcing fillers

C-1: talc (HST0.8 of Hayashi Kasei Co., Ltd., average particle diameter of about 5 μm measured by microtrack laser diffraction method)

C-2: wollastonite (Nyglos 4 of Nyco Minerals Inc., average fiber diameter of 1.7 μm, average fiber length of 21 μm)

(D) flame retardants
  D-1: triphenyl phosphate (TPP of Daihachi Chemical Industry Co., Ltd.)
  D-2: resorcinol bis(dixylenylphosphate)
    (Adekastab FP-500 of Asahi Denka Kogyo K.K.)
(E) other thermoplastic resins (impact strength modifier)
  E-1: methyl methacrylate-based composite rubber graft copolymer
    (Metablen S-2001 of Mitsubishi Rayon Co., Ltd.)
  E-2: butadiene-ethyl acrylate-methyl methacrylate graft copolymer
    (Paraloid EXL-2602 of Kureha Chemical Industry, Co., Ltd.)
(F) dripping preventing agent
  polytetrafluoroethylene having fibril forming ability
  (Polyfureon MPA FA-500 of Daikin Industries, Ltd.)

The aromatic polycarbonate resin composition of the present invention has excellent characteristic properties of an aromatic polycarbonate resin and excellent mechanical properties, particularly falling weight impact strength in a thin portion, and provides light weight, designability and portability which are required of plastic moldings such as office equipment, portable electronic equipment and car interiors. The aromatic polycarbonate resin composition of the present invention which has excellent moist heat resistance is extremely useful for a wide range of industrial application from the viewpoint of performance retention when its product is used for a long time and provides a remarkable industrial effect.

What is claimed is:
1. An aromatic polycarbonate resin composition comprising:
  (1) 10 to 90 wt % of an aromatic polycarbonate resin (component A) which is obtained from an ester exchange reaction between a diphenol and a dicarbonate ester and has a terminal hydroxyl group concentration of an amount of 10 to 70 mol % based on 100 mol % of the total of all the terminal groups; and
  (2) 90 to 10 wt % of a thermoplastic graft copolymer resin (component B) which is obtained by grafting a vinyl cyanide monomer component and an aromatic vinyl monomer component to a diene-based rubber, the proportion of the vinyl cyanide monomer component to the copolymer resin being 10 to 27 wt % and the amount of a vinyl cyanide. monomer contained in the copolymer resin being 200 ppm or less.

2. The aromatic polycarbonate resin composition of claim 1 which further contains a reinforcing filler (component C) in an amount of 1 to 100 parts by weight based on 100 parts by weight of the total of components A and B.
3. The aromatic polycarbonate resin composition of claim 1 which further contains a flame retardant (component D) in an amount of 1 to 50 parts by weight based on 100 parts by weight of the total of components A and B.
4. The aromatic polycarbonate resin of claim 1 which further contains another thermoplastic resin (component E) in an amount of 1 to 50 parts by weight based on 100 parts by weight of the total of components A and B.
5. The aromatic polycarbonate resin composition of claim 1 which comprises 50 to 90 wt % of the aromatic polycar-

TABLE 1

| | raw materials or characteristic properties | | unit | Example 1 | Example 2 | Example 3 | Example 4 | Example 5 | Example 6 | Comparative Example 1 | Comparative Example 2 | Comparative Example 3 | Comparative Example 4 |
|---|---|---|---|---|---|---|---|---|---|---|---|---|---|
| composition | (A) PC | EX-PC | wt % | 80 | 70 | 40 | 70 | 77 | 85 | 80 | | | 77 |
| | | CEX-PC | wt % | | | | | | | | 70 | 70 | |
| | (B) ABS | ABS-1 | wt % | | | | | | | 20 | | | |
| | | ABS-2 | wt % | 20 | | | | 23 | | | | | |
| | | ABS-3 | wt % | | 30 | 60 | 30 | | | | | | |
| | | ABS-4 | wt % | | | | | | | | 30 | | |
| | | ABS-5 | wt % | | | | | | 15 | | | | |
| | | ABS-6 | wt % | | | | | | | | | 30 | 23 |
| | (C) filler | C-1 | parts by weight | | | | | | 6 | | | | 6 |
| | | C-2 | parts by weight | | | | | | 12 | | | | |
| | (D) flame retardant | D-1 | parts by weight | | | | | | 10 | | | | |
| | | D-2 | parts by weight | | | | | | 12 | | | | 12 |
| | (E) rubber | E-1 | parts by weight | | | | | 3 | | | | | |
| | | E-2 | parts by weight | | | | 4 | | 3 | | | | 3 |
| | (F) | dripping preventing agent | parts by weight | | | | | 0.4 | 0.4 | | | | 0.4 |
| characteristics | falling weight impact strength | thickness of 2 mm | J | 44 | 40 | 35 | 43 | 33 | 35 | 41 | 35 | 22 | 25 |
| | impact strength | thickness of 1 mm | | 26 | 25 | 21 | 25 | 20 | 19 | 17 | 8 | 5 | 10 |
| | viscosity average molecular weight of aromatic polycarbonate resin composition before moist heat treatment | | — | 23,000 | 22,900 | 22,700 | 22,900 | 20,200 | 20,300 | 22,900 | 22,700 | 21,800 | 20,000 |
| | moist heat resistance retention | | % | 98.7 | 98.7 | 96.0 | 98.3 | 93.5 | 92.2 | 79.5 | 77.1 | 78.0 | 76.5 |
| | flame retardancy | thickness of 1.6 mm | — | — | — | — | — | V-O | V-O | — | — | — | V-O | bonate resin (component A) and 10 to 50 wt % of the thermoplastic graft copolymer resin (component B).

6. The aromatic polycarbonate resin composition of claim 1, wherein the aromatic polycarbonate resin (component A) has a terminal hydroxyl group concentration of an amount of 16 to 65 mol % based on 100 mol % of the total of all the terminal groups.

7. The aromatic polycarbonate resin composition of claim 1, wherein the amount of a vinyl cyanide monomer contained in the thermoplastic graft copolymer resin (component B) is 80 ppm or less.

8. The aromatic polycarbonate resin composition of claim 1, wherein the amount of a vinyl cyanide monomer contained in the thermoplastic graft copolymer resin (component B) is 50 ppm or less.

9. The aromatic polycarbonate resin composition of claim 1, wherein the thermoplastic graft copolymer resin (component B) comprises 3 to 60 wt % of a diene component, 30 to 80 wt % of an aromatic vinyl monomer component and 10 to 27 wt % of a vinyl cyanide monomer component.

10. The aromatic polycarbonate resin composition of claim 1, wherein the thermoplastic graft copolymer resin (component B) comprises 10 to 40 wt % of a diene component, 40 to 70 wt % of an aromatic vinyl monomer component and 11 to 27 wt % of a vinyl cyanide monomer component.

11. The aromatic polycarbonate resin composition of claim 1, wherein the thermoplastic graft copolymer resin (component B) has a graft ratio of 20 to 150%.

12. An aromatic polycarbonate resin composition comprising:
  (1) 10 to 90 wt % of an aromatic polycarbonate resin (component A) which is obtained from an ester exchange reaction between a diphenol and a dicarbonate ester and has a terminal hydroxyl group concentration of 10 to 70 mol % based on 100 mol % of the total of all the terminal groups;
  (2) 90 to 10 wt % of a thermoplastic graft copolymer resin (component B) which is obtained by grafting a vinyl cyanide monomer component and an aromatic vinyl monomer component to a diene-based rubber, the proportion of the vinyl cyanide monomer component to the copolymer resin being 10 to 27 wt % and the amount of a vinyl cyanide monomer contained in the copolymer resin being 200 ppm or less; and
  (3) 1 to 100 parts by weight of a reinforcing filler (component C) based on 100 parts by weight of the total of components A and B.

13. An aromatic polycarbonate resin composition comprising:
  (1) 10 to 90 wt % of an aromatic polycarbonate resin (component A) which is obtained from an ester exchange reaction between a diphenol and a dicarbonate ester and has a terminal hydroxyl group concentration of 10 to 70 mol % based on 100 mol % of the total of all the terminal groups;
  (2) 90 to 10 wt % of a thermoplastic graft copolymer resin (component B) which is obtained by grafting a vinyl cyanide monomer component and an aromatic vinyl monomer component to a diene-based rubber, the proportion of the vinyl cyanide monomer component to the copolymer resin being 10 to 27 wt % and the amount of a vinyl cyanide monomer contained in the copolymer resin being 200 ppm or less; and
  (3) 1 to 50 parts by weight of a flame retardant (component D) based on 100 parts by weight of the total of components A and B.

14. An aromatic polycarbonate resin composition comprising:
  (1) 10 to 90 wt % of an aromatic polycarbonate resin (component A) which is obtained from an ester exchange reaction between a diphenol and a dicarbonate ester and has a terminal hydroxyl group concentration of 10 to 70 mol % based on 100 mol % of the total of all the terminal groups;
  (2) 90 to 10 wt % of a thermoplastic graft copolymer resin (component B) which is obtained by grafting a vinyl cyanide monomer component and an aromatic vinyl monomer component to a diene-based rubber, the proportion of the vinyl cyanide monomer component to the copolymer resin being 10 to 27 wt % and the amount of a vinyl cyanide monomer contained in the copolymer resin being 200 ppm or less; and
  (3) 1 to 50 parts by weight of another thermoplastic resin (component E) based on 100 parts by weight of the total of components A and B.

15. An aromatic polycarbonate resin composition comprising:
  (1) 10 to 90 wt % of an aromatic polycarbonate resin (component A) which is obtained from an ester exchange reaction between a diphenol and a dicarbonate ester and has a terminal hydroxyl group concentration of 10 to 70 mol % based on 100 mol % of the total of all the terminal groups;
  (2) 90 to 10 wt % of a thermoplastic graft copolymer resin (component B) which is obtained by grafting a vinyl cyanide monomer component and an aromatic vinyl monomer component to a diene-based rubber, the proportion of the vinyl cyanide monomer component to the copolymer resin being 10 to 27 wt % and the amount of a vinyl cyanide monomer contained in the copolymer resin being 200 ppm or less;
  (3) 1 to 100 parts by weight of a reinforcing filler (component C) based on 100 parts by weight of the total of components A and B;
  (4) 1 to 50 parts by weight of a flame retardant (component D) based on 100 parts by weight of the total of components A and B; and
  (5) 1 to 50 parts by weight of another thermoplastic resin (component E) based on 100 parts by weight of the total of components A and B.

16. A molded product formed from the aromatic polycarbonate resin composition of claim 1.

17. The molded product of claim 16 which has a moist heat resistance retention of at least 85%.

18. The molded product of claim 16 which has a moist heat resistance retention of at least 85% and a falling weight impact strength (thickness of 2 mm) of 30 to 50 J.

19. The aromatic polycarbonate resin composition of claim 2 which further contains a flame retardant (component D) in an amount of 1 to 50 parts by weight based on 100 parts by weight of the total of components A and B.

20. The aromatic polycarbonate resin of claim 2 which further contains another thermoplastic resin (component E) in an amount of 1 to 50 parts by weight based on 100 parts by weight of the total of components A and B.

21. The aromatic polycarbonate resin of claim 3 which further contains another thermoplastic resin (component E) in an amount of 1 to 50 parts by weight based on 100 parts by weight of the total of components A and B.

22. The aromatic polycarbonate resin of claim 19 which further contains another thermoplastic resin (component E) in an amount of 1 to 50 parts by weight based on 100 parts by weight of the total of components A and B.

23. A molded product formed from the aromatic polycarbonate resin composition of claim 12.

24. A molded product formed from the aromatic polycarbonate resin composition of claim 13.

25. A molded product formed from the aromatic polycarbonate resin composition of claim 14.

26. A molded product formed from the aromatic polycarbonate resin composition of claim 15.

27. The molded product of claim 23 which has a moist heat resistance retention of at least 85%.

28. The molded product of claim 24 which has a moist heat resistance retention of at least 85%.

29. The molded product of claim 25 which has a moist heat resistance retention of at least 85%.

30. The molded product of claim 26 which has a moist heat resistance retention of at least 85%.

31. The molded product of claim 23 which has a moist heat resistance retention of at least 85% and a falling weight impact strength (thickness of 2 mm) of 30 to 50 J.

32. The molded product of claim 24 which has a moist heat resistance retention of at least 85% and a falling weight impact strength (thickness of 2 mm) of 30 to 50 J.

33. The molded product of claim 25 which has a moist heat resistance retention of at least 85% and a falling weight impact strength (thickness of 2 mm) of 30 to 50 J.

34. The molded product of claim 26 which has a moist heat resistance retention of at least 85% and a falling weight impact strength (thickness of 2 mm) of 30 to 50 J.

* * * * *